(12) United States Patent
Im et al.

(10) Patent No.: US 10,867,022 B2
(45) Date of Patent: Dec. 15, 2020

(54) METHOD AND APPARATUS FOR PROVIDING AUTHENTICATION USING VOICE AND FACIAL DATA

(71) Applicant: Hoseo University Academic Cooperation Foundation, Asan-si (KR)

(72) Inventors: Tae Ho Im, Seoul (KR); Hyo Chan Lee, Cheonan-si (KR); Hyun Hak Song, Hwaseong-si (KR)

(73) Assignee: HOSEO UNIVERSITY ACADEMIC COOPERATION FOUNDATION, Asan-si (KR)

(*) Notice: Subject to any disclaimer, the term of this patent is extended or adjusted under 35 U.S.C. 154(b) by 0 days.

(21) Appl. No.: 16/681,045

(22) Filed: Nov. 12, 2019

(65) Prior Publication Data

US 2020/0364321 A1   Nov. 19, 2020

(30) Foreign Application Priority Data

May 14, 2019   (KR) .................. 10-2019-0056093

(51) Int. Cl.
| | | |
|---|---|---|
| *G06F 7/04* | (2006.01) | |
| *G06F 15/16* | (2006.01) | |
| *H04L 29/06* | (2006.01) | |
| *G06F 21/32* | (2013.01) | |
| *G06F 21/55* | (2013.01) | |
| *G06N 3/08* | (2006.01) | |
| *G06N 3/04* | (2006.01) | |

(52) U.S. Cl.
CPC ............ *G06F 21/32* (2013.01); *G06F 21/554* (2013.01); *G06N 3/04* (2013.01); *G06N 3/08* (2013.01); *G06F 2221/034* (2013.01)

(58) Field of Classification Search
CPC ........ G07C 9/37; G07C 9/25; G06K 9/00892; G10L 17/00; G10L 17/005; G06F 21/32; G06F 21/554; G06F 2221/034; G06N 3/08; G06N 3/04
See application file for complete search history.

(56) References Cited

U.S. PATENT DOCUMENTS

| | | | | |
|---|---|---|---|---|
| 5,265,191 A * | 11/1993 | McNair | ................... | G10L 17/22 704/273 |
| 5,761,329 A * | 6/1998 | Chen | .................. | G06K 9/00892 382/116 |
| 6,219,639 B1 * | 4/2001 | Bakis | ................. | G06K 9/00885 382/116 |
| 2005/0047664 A1 * | 3/2005 | Nefian | ................. | G06K 9/6297 382/228 |
| 2007/0195998 A1 * | 8/2007 | Le Saint | ................ | G07C 9/257 382/115 |

(Continued)

FOREIGN PATENT DOCUMENTS

| | | |
|---|---|---|
| KR | 10-1208678 | 11/2012 |
| KR | 10-1751175 | 6/2017 |
| KR | 10-2018-0052900 | 5/2018 |

*Primary Examiner* — Trong H Nguyen
(74) *Attorney, Agent, or Firm* — Lex IP Meister, PLLC

(57) ABSTRACT

The present invention relates to user authentication, and more particularly, to a method and an apparatus for providing authentication using voice and facial data, in which a voice and a face of a user are recognized and authenticated using an deep learning model, so that theft due to leakage of a password of a security device is prevented from occurring.

4 Claims, 3 Drawing Sheets

(56) References Cited

U.S. PATENT DOCUMENTS

| | | | |
|---|---|---|---|
| 2011/0235870 A1* | 9/2011 | Ichikawa | G06F 21/83 382/118 |
| 2014/0237576 A1* | 8/2014 | Zhang | G06F 21/32 726/7 |
| 2018/0232591 A1* | 8/2018 | Hicks | G06K 9/6297 |

* cited by examiner

[FIG. 1]
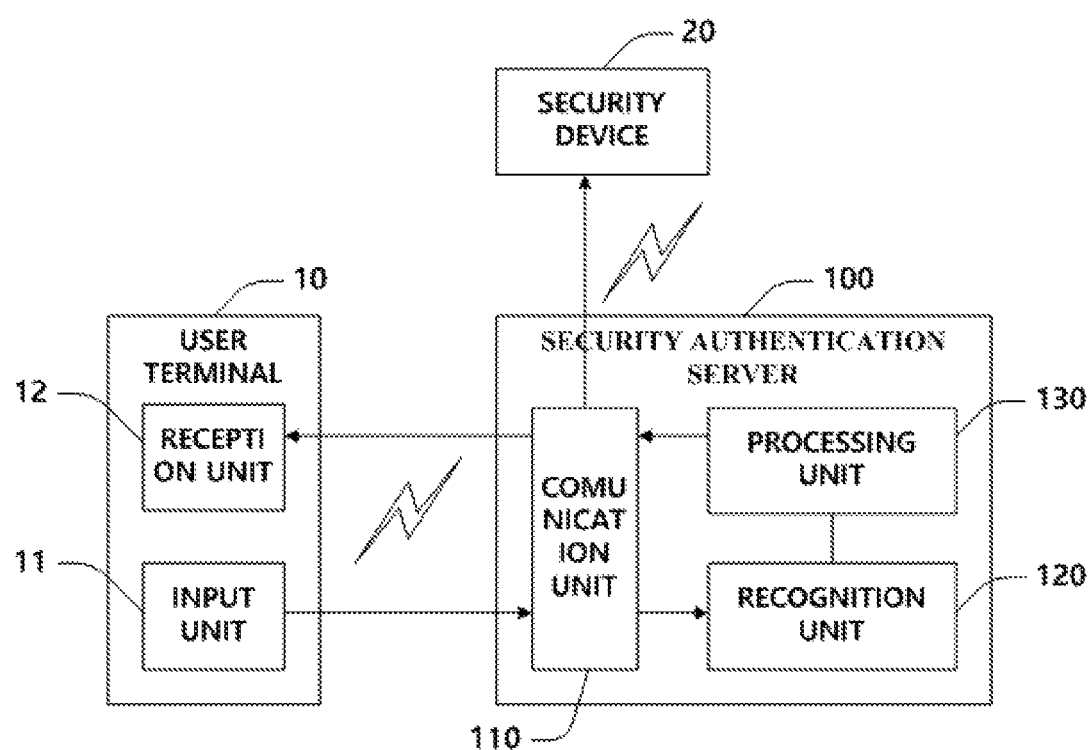

[FIG. 2]
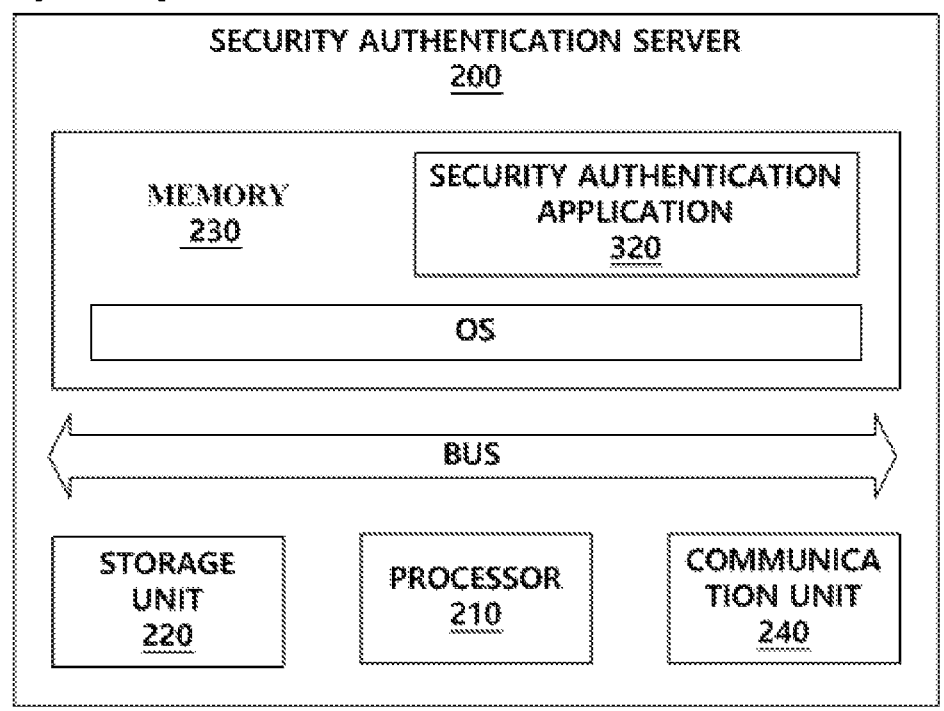

[FIG. 3]
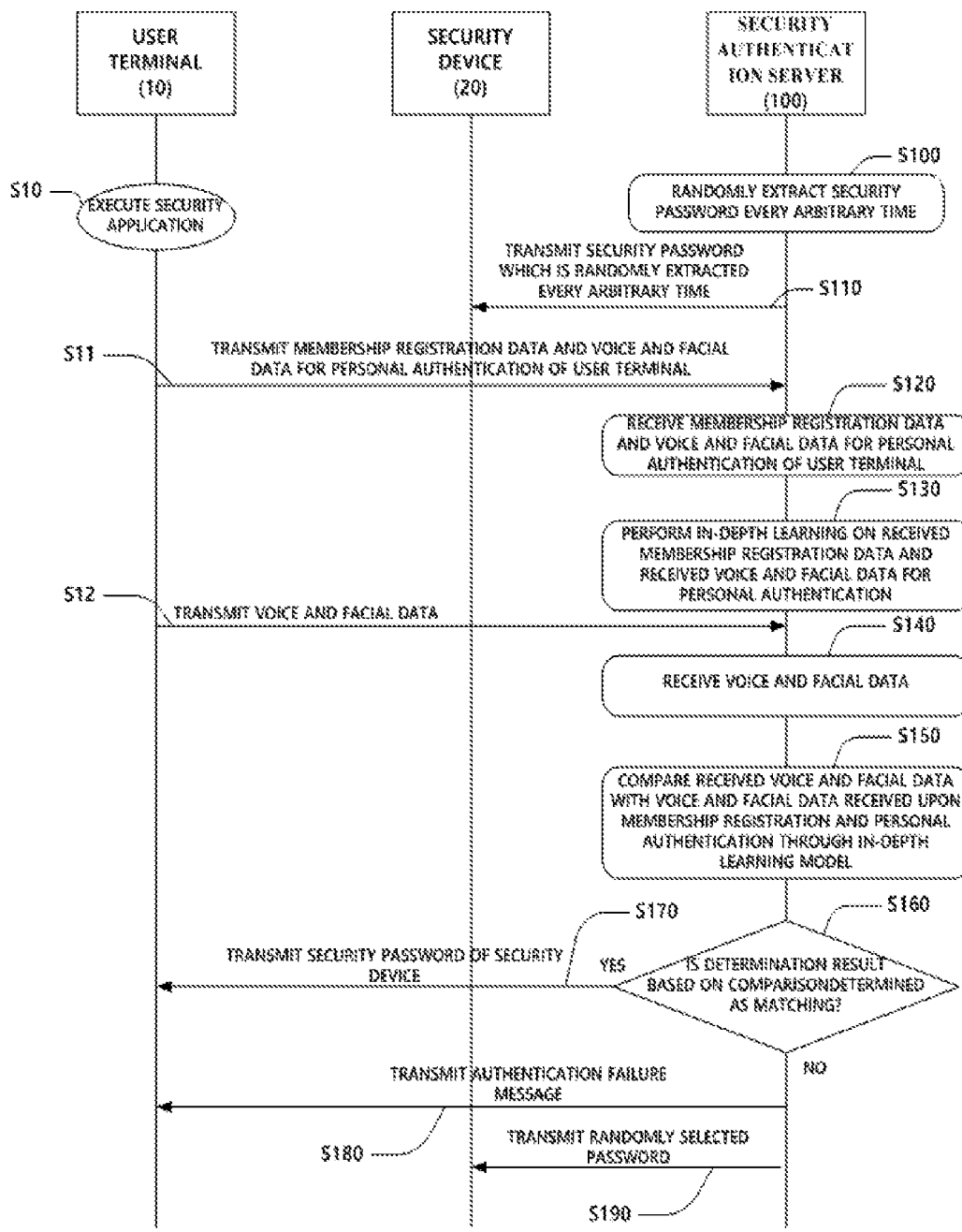

METHOD AND APPARATUS FOR PROVIDING AUTHENTICATION USING VOICE AND FACIAL DATA

BACKGROUND OF THE INVENTION

1. Field of the Invention

The present invention relates to user authentication, and more particularly, to a method and an apparatus for providing authentication using voice and facial data, in which a voice and a face of a user are recognized and authenticated using an deep learning model, so that theft due to leakage of a password of a security device is prevented from occurring.

2. Description of the Related Art

From the past to the present, CCTVs, alarms, door locks, and the like have been widely used to restrict access of an outsider. The CCTV uses a video processing technology to analyze and identify a human behavior in real time, not just to record and play a video, but it is still technically insufficient to perform the analysis and identification. In addition, the alarm is one of devices widely used in practice, and is useful upon illegal access of outsiders. However, since the alarm malfunctions frequently and does not allow a user to check a situation immediately, the alarm is used together with the CCTV. In addition, referring to the door lock, an electromagnetic technology, which is a touch type, is popularly used rather than a mechanical technology using a lock. The electromagnetic technology is convenient for the user, but there is high probability of leakage of a password due to a fingerprint left on the door lock because the electromagnetic technology uses a touch. In addition, many of voice recognition and face recognition techniques have been implemented with an expedient, causing the security to be easily failed. For example, the failure of security may occur when a photograph is printed out to recognize a face, or a voice is recognized through a recorded file. In this case, a recognition function may not play a role in the security when a password of a security device is leaked.

DOCUMENTS OF RELATED ART

Patent Documents (Patent Document 1) KR 10-2018-0087088 A
(Patent Document 2) KR 10-2013-0032429 A

SUMMARY OF THE INVENTION

The present invention has been made in an effort to solve the above-mentioned problems, and relates to a method and an apparatus for providing authentication using voice and facial data, in which a voice and a face of a user are recognized and authenticated using an deep learning model, so that theft due to leakage of a password of a security device is prevented from occurring so as to prevent an outsider from accessing.

To achieve the above object, in accordance with one aspect of the present invention, there is provided a method for providing authentication using voice and facial data, the method including: (a) receiving an entirety or a part of voice and facial data obtained from a user terminal; (b) comparing the data received in operation (a) with an entirety or a part of voice and facial data authenticated from the user terminal upon membership registration through an deep learning model; and (c) providing an authentication password of a security device to the user terminal when a determination result based on the comparison in operation (b) is determined as matching.

Preferably, the method may further include immediately changing the authentication password of the security device when the determination result based on the comparison in operation (c) is determined as non-matching.

The part of the voice and facial data may include data obtained by removing a noise from the entirety of the voice data, and data obtained by removing other information except for a face from the entirety of the facial data.

The deep learning model may be trained by collecting a voice and a face that are similar to the voice and facial data authenticated through the user terminal upon the membership registration.

To achieve the above object, in accordance with another aspect of the present invention, there is provided an apparatus for providing authentication using voice and facial data, the apparatus including: a communication unit configured to receive voice and facial data from a user terminal; a recognition unit configured to compare the voice and facial data received through the communication unit with voice and facial data authenticated from the user terminal upon membership registration through an deep learning model; and a processing unit configured to determine according to the comparison of the recognition unit and provide authentication information.

According to the present invention, the user of the security device may obtain the password only after voice and face authentication so that other persons cannot use the security device, and the password of the security device is changed every hour so that an excellent security effect can be obtained.

In addition, in order to prevent other persons who have stolen personal information of the user from arbitrarily attempting authentication, a video is recorded whenever the authentication is performed to obtain data, thereby preventing the illegal use of the security device.

BRIEF DESCRIPTION OF THE DRAWINGS

FIG. 1 is a schematic view illustrating an entire system for providing authentication using voice and facial data according to the present invention.

FIG. 2 is a view illustrating a security authentication server in the form of a computer device in the entire system according to FIG. 1.

FIG. 3 is a flowchart illustrating a method for providing authentication using voice and facial data according to the present invention.

DETAILED DESCRIPTION OF THE INVENTION

Hereinafter, exemplary embodiments of the present invention will be described in detail with reference to the accompanying drawings. Prior to the description of the present invention, it will be noted that the terms and wordings used in the specification and the claims should not be construed as general and lexical meanings, but should be construed as the meanings and concepts that agree with the technical spirits of the present invention, based on the principle stating that the concepts of the terms may be properly defined by the inventor(s) to describe the invention in the best manner. Therefore, since the examples described in the specification and the configurations illustrated in the drawings are merely for the preferred embodiments of the present invention but cannot represent all the technical sprints of the present invention, it should be understood that various equivalents and modifications that may substitute for the examples and configurations can be made at the filing of the present application.

FIG. 1 is a schematic view illustrating an entire system for providing authentication using voice and facial data according to the present invention.

As shown in the drawing, an entire system for providing authentication using voice and facial data according to the present invention includes: a user terminal 10; a security authentication server 100 connected to the user terminal 10 through a network; and a security device 20 secured and managed by the security authentication server 100.

The user terminal 10 may be a smart terminal such as a mobile phone or a PDA, and an Internet network is established between the user terminal 10 and the security authentication server 100. The user terminal 10 may include: an input unit 11 configured to receive voice and facial data of a user; and a reception unit 12 configured to receive data from the security authentication server 100. In addition, the user terminal 10 may perform personal authentication for membership registration from the security authentication server 100 in order to authenticate a user of the security device 20. The user terminal 10 may download a security application of the security device 20 from the security authentication server 100 through the Internet network, and execute the downloaded application to enable the membership registration.

The security device 20 may be a device locked with a password, which may be a door lock or the like, but the embodiment is not limited thereto. The security device 20 may be interlocked with the user terminal 10, and may receive a security password which is randomly extracted every hour under the management of the security authentication server 100.

The security authentication server 100 may include a communication unit 110 configured to receive voice and facial data of a user collected through the input unit 11 of the user terminal 10; a recognition unit 120 configured to recognize the user with the voice and facial data of the user; and a processing unit 130 configured to determine a recognition matching state through the voice and facial data recognized from the recognition unit 120.

The communication unit 110 may receive the voice and facial data of the user collected from the user terminal 10 and transmit a security password and a security message based on a recognition result received from the processing unit 130.

The recognition unit 120 may compare the voice and facial data received through the communication unit 110 with the voice and facial data authenticated from the user terminal 10 upon the membership registration through an deep learning model. In this case, the deep learning model may be trained by collecting a voice and a face similar to the voice and facial data authenticated through the user terminal 10 upon the membership registration. For example, the user may execute the security application by using the user terminal 10, and perform the membership registration and security authentication using the user terminal 10. At this time, the user may read out the numbers 1 to 10 according to guidance through the security application, and an image is taken whenever the user reads out the numbers to collect the voice data and the facial data, so that the recognition unit 120 may receive the collected data through the communication unit 110. Thereafter, the recognition unit 120 may collect voice and facial data similar to the received voice and facial data to perform deep learning training. In addition, after the training is completed, the recognition unit 120 may receive information when the user reads out the number shown in a video provided by the security application whenever the user performs the security authentication by using the user terminal 10 so as to perform various preprocessing. The preprocessing is for analyzing a mouth shape and the voice data of the user to determine whether the mouth shape and the voice data are synchronized with each other in order to prevent the illegal use of the security device. In addition, in order to process the result faster, a noise of the voice data may be removed, and other backgrounds except for the face may be removed from the facial data, so that the data may be sophisticated. In this case, a part of the data may be used by performing the preprocessing, or an entirety of the data may be used without performing the preprocessing. In addition, based on the entirety or part of the voice and facial data authenticated upon the membership registration, the comparison may be performed through the deep learning model.

The processing unit 130 may be connected to the recognition unit 120 to provide an authentication password of the security device 20 to the user terminal 10 or transmit a recognition failure message to the user terminal according to a determination result based on the comparison of the recognition unit 120. At this time, it may be determined as recognition matching only when the determination result based on the comparison of the recognition unit 120 is recognized as 95% or more. Meanwhile, it may be determined as recognition non-matching when the determination result is 95% or less. In this case, when it is determined as the recognition non-matching, the processing unit 130 may transmit a randomly selected password to the security device 20 to immediately change the password of the security device 20. In addition, the processing unit 130 may transmit a new authentication password to the security device 20 every hour, regardless of the recognition of the recognition unit 120, so as to change the authentication password.

In this case, the security authentication server 100 of FIG. 1 may be configured in hardware, and may be executed by an operation of a security authentication application through an artificial neural network. FIG. 2 is a view illustrating a security authentication server in the form of a computer device.

The security authentication server 200 may include a processor 210; a non-volatile storage unit 220 configured to store a program and data; a volatile memory 230 configured to store a running program; a communication unit 240 configured to perform communication with other devices; and a bus which is an internal communication path among the above devices. The running program may include a device driver, an operating system, and various applications. Although not shown, an electronic device may include a power supply unit such as a battery.

The communication unit 240 may transmit the received voice and facial data of the user to a security authentication application 320. As described above, the security authentication application 320 may receive the voice and facial data of the user transmitted from the user terminal. In addition, the security authentication server 200 may receive the voice and facial data of the user from a data interface device (not shown) or the like to appropriately transmit the received data to the security authentication application 320. In other words, the data interface device may serve as a sort of a buffer in such a process of transmitting the voice and facial data to the security authentication application 320.

The security authentication application 320 may perform comparison based on the entirety or part of the voice and facial data authenticated from the user terminal as described above upon the membership registration. The security authentication application 320 may be a program installed and operated in the security authentication server 200, and a method of providing authentication performed by executing the security authentication application 320 will be described in detail below with reference to FIG. 3, while FIG. 3 illustrates the method as a process performed in the entire system according to FIG. 1.

FIG. 3 is a flowchart illustrating a method for providing authentication using voice and facial data according to the present invention.

First, the user terminal 10 may execute a security app (S110), and when membership registration data of the security device 20 and voice and facial data for personal authentication of the user terminal are transmitted to the security authentication server 100 (S11), the security authentication server 100 may receive the transmitted data (S120). In addition, the security authentication server 100 may perform deep learning training by preprocessing the voice and facial data received in operation S120 (S130). In this case, the security authentication server 100 may or may not perform the preprocessing as described above.

Thereafter, the security authentication server 100 may receive the voice and facial data obtained from the user terminal (S140), and comparison is performed through an deep learning model based on the voice and facial data received in operation S120 (S150).

If a determination result based on the comparison (S160) is determined as matching, a security password of the security device 20 may be transmitted to the user terminal 10 (S170), and the user terminal 10 may receive the transmitted password to release the security device.

Meanwhile, if the determination result based on the comparison (S160) is determined as non-matching, the security authentication server 100 may transmit an authentication failure message to the user terminal (S180) and may simultaneously transmit a randomly selected password to the security device 20 (S190). Therefore, the password of the security device may be immediately changed.

Accordingly, upon access of other persons to the security device, a message is transmitted to the user terminal of the user about the situation at the moment, and a surrounding environment of the device may be checked by an installed camera, so that the user may respond immediately.

As described above, although specific embodiments and drawings of the present invention have been described, the present invention is not limited thereto. It is understood that various changes and modifications can be made by those of ordinary skill in the art to which the invention pertains within the technical spirit of the present invention and the equivalent scope of the appended claims.

What is claimed is:

1. A method for providing authentication using voice and facial data, the method comprising:
   (a) receiving an entirety or a part of obtained data including voice and facial data obtained from a user terminal, the facial data of the obtained data being a mouth shape data of a user;
   (b) comparing the obtained data received in step (a) with an entirety or a part of voice and facial data authenticated from the user terminal upon membership registration through a deep learning model, step (b) including determination about whether the mouth shape data of the obtained data and the voice data of the obtained data are synchronized with each other;
   (c) providing an authentication password of a security device to the user terminal when a determination result based on the comparison in step (b) is determined as matching; and
   (d) providing a randomly selected password to the security device when a determination result based on the comparison in step (b) is determined as non-matching.

2. The method of claim 1, wherein the part of the voice and facial data of the obtained data includes data obtained by removing a noise from the entirety of the voice data of the obtained data, and data obtained by removing other information except for a face from the entirety of the facial data of the obtained data.

3. The method of claim 1, wherein the deep learning model is trained by collecting a voice and a face that are similar to the voice and facial data authenticated through the user terminal upon the membership registration,
   the voice and facial data authenticated through the user terminal upon the membership registration being collected at a moment when the user reads out words requested to do so.

4. The method of claim 1, wherein, in step (a), the obtained data is received when the user reads out a number shown in a video.

* * * * *